(No Model.)

J. C. ERNST.
SCREW HOOK.

No. 276,375.

Patented Apr. 24, 1883.

WITNESSES

John C. Ernst INVENTOR
By Leggett & Leggett
ATTORNEYS

UNITED STATES PATENT OFFICE.

JOHN C. ERNST, OF CLEVELAND, OHIO.

SCREW-HOOK.

SPECIFICATION forming part of Letters Patent No. 276,375, dated April 24, 1883.

Application filed December 12, 1882. (No model.)

*To all whom it may concern:*

Be it known that I, JOHN C. ERNST, of Cleveland, in the county of Cuyahoga and State of Ohio, have invented certain new and useful Improvements in Screw-Hooks; and I do hereby declare the following to be a full, clear, and exact description of the invention, such as will enable others skilled in the art to which it pertains to make and use the same.

My invention relates to improvements in screw-hooks, and more especially that class of screw-hooks that are used for hanging ornaments and picture-frames; and it consists of parts and combinations of parts more fully hereinafter described.

The object of my invention is to make a screw-hook that shall combine the essential qualities of the screw-hooks in common use with an ornamental head, such as is sometimes used on nails that are driven into the wall for the same purpose.

Figure 1:
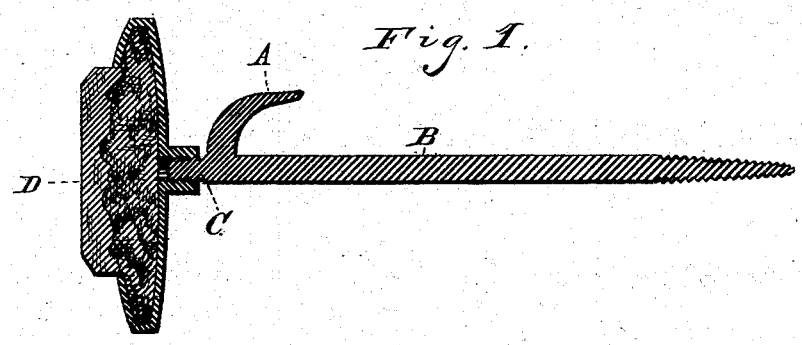
Figure 2:
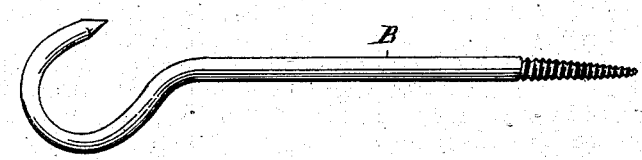
Figure 3:
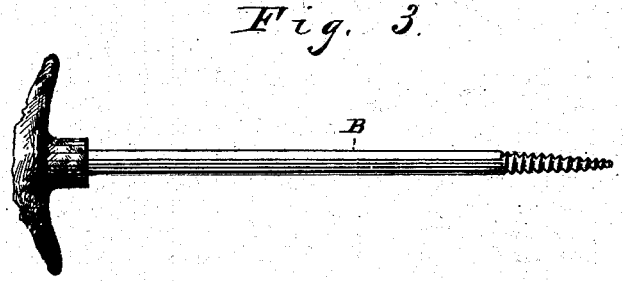

In the drawings, Figure 1 is a vertical longitudinal sectional view of my device. Fig. 2 is a common screw-hook. Fig. 3 is a nail with an ornamented head.

In Fig. 1, A represents the hook; B, the shank or screw end for fastening to the wall or ceiling; and C, an end extending forward from the hook, provided with a thread for attaching the ornamental head D. It will be seen that this hook is made in such shape that it is equally adapted to fastening to the ceiling. It was found impracticable to use the said nails in many places, for the reason that in attempting to drive them into a thin and yielding substance—such as common lath—the plastering would be injured and broken, and the nails, when driven, would sustain but little weight, and also it was sometimes difficult to remove them when necessary, and the walls were often injured in so doing. On the other hand, the common screw-hook, while obviating the difficulties of the nail aforesaid, presented an unsightly appearance. I have therefore devised an end extending forward from the hook, to which can be attached an ornamented head of any desired shape, material, or construction. The said head is designed to cover the hook, and if good taste and judgment are used in selecting a head suitable to the picture suspended a very pleasing effect may be had.

What I claim is—

1. A screw-hook having a projection extending forward from the hook for the attachment of a head, substantially as set forth.

2. A screw-hook having a screw-threaded projection extending forward from the hook and a head secured to said projection, substantially as set forth.

In testimony whereof I sign this specification, in the presence of two witnesses, this 25th day of November, 1882.

JOHN C. ERNST.

Witnesses:
 C. H. DORER,
 A. E. LYNCH.